United States Patent
Tucker et al.

(10) Patent No.: US 10,345,866 B2
(45) Date of Patent: Jul. 9, 2019

(54) COMPUTING DEVICE WITH MAGNETIC HINGE

(71) Applicant: Lenovo (Singapore) Pte. Ltd., Singapore (SG)

(72) Inventors: Matthew Ian Tucker, Durham, NC (US); Joseph David Plunkett, Raleigh, NC (US); Cuong Huy Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 31 days.

(21) Appl. No.: 15/426,348

(22) Filed: Feb. 7, 2017

(65) Prior Publication Data
US 2018/0224897 A1    Aug. 9, 2018

(51) Int. Cl.
*G06F 1/16* (2006.01)
*E05D 1/06* (2006.01)
*E05D 3/12* (2006.01)

(52) U.S. Cl.
CPC ............. *G06F 1/1681* (2013.01); *E05D 1/06* (2013.01); *E05D 3/122* (2013.01); *G06F 1/1618* (2013.01); *G06F 1/1654* (2013.01); *E05Y 2201/46* (2013.01); *E05Y 2900/606* (2013.01); *Y10T 16/541* (2015.01)

(58) Field of Classification Search
CPC .... G06F 1/1681; G06F 1/1654; G06F 1/1618; G06F 1/1616; G06F 1/1679; E05D 7/10; E05D 11/08; E05D 3/122; E05D 1/06; H04M 1/0214
See application file for complete search history.

(56) References Cited

U.S. PATENT DOCUMENTS

| | | |
|---|---|---|
| 5,129,276 A | 7/1992 | Fahy et al. |
| 5,946,991 A | 9/1999 | Hoopman |
| 5,987,704 A | 11/1999 | Tang |
| 5,995,373 A | 11/1999 | Nagai |
| 6,519,812 B2 | 2/2003 | Ko et al. |
| 7,197,332 B2 | 3/2007 | Andersson |
| 7,345,872 B2 | 3/2008 | Wang |
| 7,876,288 B1 * | 1/2011 | Huang .................. G06F 1/1616 345/178 |
| 8,599,542 B1 * | 12/2013 | Healey .................. G06F 1/1626 345/168 |
| 8,782,853 B2 | 7/2014 | Ge |
| 8,938,855 B2 | 1/2015 | Ahn et al. |
| 9,190,792 B2 | 11/2015 | Dreisewerd |
| 9,274,552 B2 | 3/2016 | Ahn et al. |

(Continued)

OTHER PUBLICATIONS

Gadgetdiary.com, Logitech Ultrathin Keyboard Cover Magnetic Clip, Jan. 2013 (1 page).

(Continued)

*Primary Examiner* — Abhishek M Rathod
(74) *Attorney, Agent, or Firm* — Brian J. Pangrie

(57) ABSTRACT

An apparatus can include a processor; memory accessible by the processor; a first housing that includes the processor and a first magnetic edge that includes a first engagement surface; and a second housing that includes an electronic component accessible by the processor and a second magnetic edge that includes a second engagement surface that engages the first engagement surface to pivotably couple the first housing and second housing.

16 Claims, 10 Drawing Sheets

(56) References Cited

U.S. PATENT DOCUMENTS

| | | | |
|---|---|---|---|
| 9,371,676 B2 | 6/2016 | Rittenhouse | |
| 9,625,952 B2* | 4/2017 | Holung | G06F 1/1681 |
| 2005/0050686 A1 | 3/2005 | Kurokawa | |
| 2005/0122671 A1 | 6/2005 | Homer | |
| 2008/0184530 A1 | 8/2008 | Chao | |
| 2008/0232043 A1* | 9/2008 | Wang | G06F 1/1618 361/679.3 |
| 2008/0242359 A1 | 10/2008 | Seol | |
| 2009/0070961 A1 | 3/2009 | Chung | |
| 2009/0244009 A1 | 10/2009 | Staats | |
| 2009/0278642 A1 | 11/2009 | Fullerton et al. | |
| 2010/0123663 A1 | 5/2010 | Leung | |
| 2010/0238620 A1* | 9/2010 | Fish | G06F 1/1616 361/679.09 |
| 2010/0277860 A1 | 11/2010 | Jeong et al. | |
| 2011/0128216 A1 | 6/2011 | Renwick | |
| 2011/0205695 A1 | 8/2011 | Hassemer et al. | |
| 2012/0113578 A1 | 5/2012 | Holung | |
| 2012/0147535 A1 | 6/2012 | Ahn et al. | |
| 2012/0170243 A1 | 7/2012 | Griffin | |
| 2013/0170126 A1* | 7/2013 | Lee | G06F 1/1654 361/679.17 |
| 2013/0242495 A1 | 9/2013 | Bathiche et al. | |
| 2013/0279096 A1* | 10/2013 | Gengler | H05K 7/00 361/679.01 |
| 2013/0322004 A1 | 12/2013 | Park | |
| 2013/0346636 A1 | 12/2013 | Bathiche | |
| 2014/0360296 A1* | 12/2014 | Hsu | G06F 1/1616 74/98 |
| 2015/0023030 A1 | 1/2015 | Tsukamoto | |
| 2015/0146362 A1 | 5/2015 | Meyers | |
| 2015/0277491 A1* | 10/2015 | Browning | G06F 1/1632 361/679.44 |
| 2015/0281413 A1 | 10/2015 | Longo | |
| 2016/0048173 A1* | 2/2016 | Lyles | G06F 1/1681 361/679.17 |
| 2016/0070310 A1 | 3/2016 | Holung et al. | |
| 2016/0349801 A1 | 12/2016 | Liang et al. | |
| 2016/0363962 A1 | 12/2016 | Chiu | |
| 2017/0017273 A1 | 1/2017 | Weldon | |
| 2017/0068282 A1 | 3/2017 | Smith | |
| 2017/0075381 A1 | 3/2017 | Koo | |
| 2017/0145724 A1 | 5/2017 | Siddiqui | |
| 2017/0145725 A1 | 5/2017 | Siddiqui | |
| 2017/0153664 A1 | 6/2017 | Tsai | |

OTHER PUBLICATIONS

Mechanismsmarket.com, Polymagnet Guide, Jan. 2016 (4 pages).
Liliputing.com, Acer Aspire Switch 10 2-in-1 Windows tablet review, Jul. 2, 2014 (20 pages).
Acer, Aspire Switch 10 User's Manual, May 2014 (76 pages).
Amazingmagnets.com, Item Code: FC20N03-FC-20S03-D125F-PAIR, 2015 (3 pages).
Amazingmagnets.com, Item Code: FS20S04-FS20S05-D125H-PAIR, 2015 (3 pages).
Amazingmagnets.com, Spring Polymagnets, 2015 (3 pages).
Polymagnet.com, Correlated Magnetics Introduces Smart Magnet Kits for Tablet and Mobile Accessories, May 20, 2015 (3 pages).
Marlborohinge.com, Standard Hinge Terminology, Jan. 2016 (3 pages).
Gadgetdiary.com, Logitech Ultrathin Keyboard Cover Review, Jan. 26, 2013 (5 pages).
Amazing Magnets, P125DH, Jan. 18, 2012 (1 page).
Polymagnet, Differentiate Your Product Design with Polymagnets, Aug. 2015 (6 pages).
Polymagnet, Smart Magnets for Smart Product Design, Aug. 2015 (7 pages).
Polymagnet, Smart Magnets for Precision Alignment, Aug. 2015 (10 pages).
Polymagnet, Brant, I., Smart Magnets for Product Design that Surprises the Senses, Whitepaper, Jan. 5, 2016 (13 pages).
Smith, Optimal shapes for Gears, NEC Research Institute, Princeton, NJ 1993 (19 pages).

* cited by examiner

COMPUTING DEVICE WITH MAGNETIC HINGE

TECHNICAL FIELD

Subject matter disclosed herein generally relates to technology for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

An apparatus can include a processor; memory accessible by the processor; a first housing that includes the processor and a first magnetic edge that includes a first engagement surface; and a second housing that includes an electronic component accessible by the processor and a second magnetic edge that includes a second engagement surface that engages the first engagement surface to pivotably couple the first housing and second housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
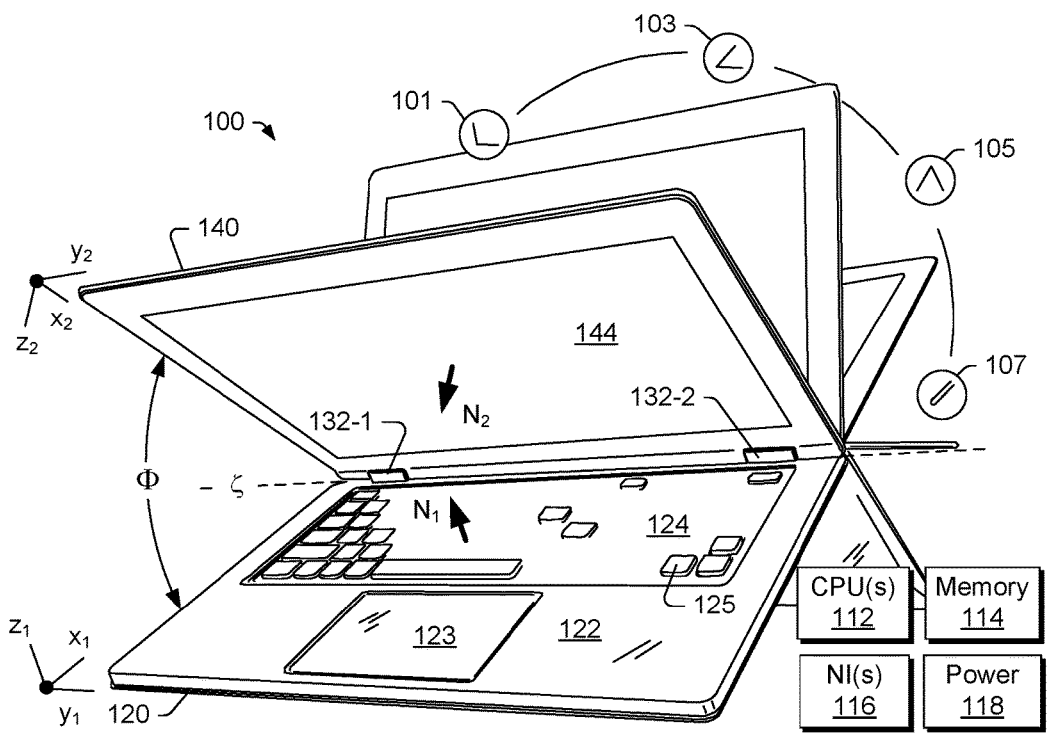
FIG. 1 is a diagram of an example of a device.
Figure 1:
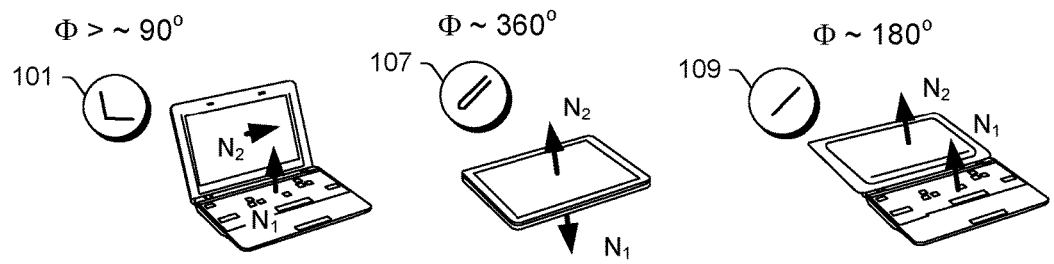
Figure 1:
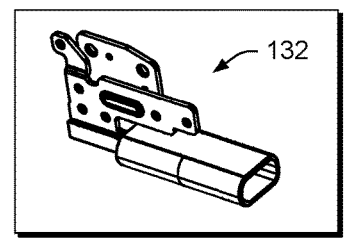

FIG. 1 shows an example of a device 100 that includes a keyboard housing 120 and a display housing 140 that are pivotable with respect to each other via movement about one or more hinges 132-1 and 132-2 (e.g., hinge assemblies). An example of a hinge assembly 132 is shown in a perspective view where the hinge assembly includes two saddles and a housing that covers gears that mesh two axles where one of the axles is connected to one saddle (e.g., a keyboard housing saddle) and where another one of the axles is connect to the other saddle (e.g., a display housing saddle). The hinge assembly 132 may allow for 0 degree to 360 degree orientation of the housings 120 and 140, for example, the hinge assembly 132 as shown may correspond to a closed clamshell orientation of the housings 120 and 140 or to a tablet orientation of the housings 120 and 140. The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle $\theta$ is about 0 degrees), the vectors $N_1$ and $N_2$ would be pointing toward each other.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

In the example of FIG. 1, the device 100 can include bridge pieces (e.g., hinge saddles, other hinge assembly components, etc.) that hold the housings 120 and 140 together where, for example, the device is a 360 degree folding "convertible" laptop. As shown, the device 100 can include cutouts in the housings 120 and 140 that fit the bridge pieces and/or a housing that covers gears and axles where the gears mesh to allow for rotation of the axles and housings 120 and 140).

As an example, a device can include a magnetic hinge where housings coupled via the magnetic hinge do not include cutouts. In such an example, the magnetic hinge may operate without saddles that are connected to axles that mesh via gears. For example, a magnetic hinge may optionally be a gearless hinge. As an example, a magnetic hinge may be a hinge without mechanical coupling of a keyboard housing and a display housing where mechanical coupling is a type of coupling achieved via the hinge assembly 132 shown in FIG. 1. As an example, a magnetic hinge or magnetic hinges may allow for a device to have a keyboard housing and to have a display housing that do not include cutouts (e.g., mechanical hinge cutouts that accommodate mechanical hinge component(s)). As an example, a magnetic hinge or magnetic hinges may hold a keyboard housing to a display housing while allowing for orientations of the display housing with respect to the keyboard housing.

As an example, a laptop (e.g., laptop computer) can use magnets in a top (screen) half of the laptop and in the bottom (keyboard) half of the laptop to hold the two halves together. The magnets can provide magnetic attraction force to hold the top half attached to the bottom half, which may be permanent with respect to an ordinary user (e.g., a non-detachable) or may be detachable by a user, for example, consider a configuration where the screen can be removed.

As an example, magnetic components can be disposed widthwise along one or more portions of a back edge of a keyboard housing and a display housing, for example, near an axis that the display housing rotates around to open it from the keyboard housing. As an example, magnetic components may offer relatively low resistance to user adjustment and may, for example, be adjustable incrementally via arrangements of magnetic components in the keyboard housing and in the display housing. As an example, one or both of the keyboard housing and the display housing may include adjustable magnetic components that may adjust an angle of orientation. For example, consider a cylinder that includes a plurality of magnetic components that may be adjustable (e.g., rotatable and/or axially translatable) such that adjustments may be made to one or more orientations.

As an example, magnetic components may be included to cause minimal resistance to opening a laptop. As an example, magnetic components may be included in a laptop to prevent a screen half from being pulled away from a keyboard half of the laptop. As an example, one or more physical features may be included to constrain a screen half to rotating around an axis for normal opening.

As an example, a laptop may be free of "bridge" features such as, for example, cutouts. As an example, a laptop may be visibly free of mechanical hinge pieces, which may be intriguing to a user.

As an example, a device can include a keyboard housing and a display housing where magnetic components operatively couple the housings. As an example, magnetic components may be self-aligning. For example, magnetic components may "snap" to an orientation that may be the closest orientation and, for example, upon application of force by hand of a user, the orientation may be changed where again the device may "snap" to an orientation.

As an example, a device can include correlated magnetic components that may be configured to adjust polarity for pointing portions of the device (e.g., housings) in a selected direction of multiple selectable directions. As an example, one housing can include one or more magnetic components and another housing can include one or more magnetic components where at least a portion of the magnet components can generate magnetic attraction force that operatively couples the housings where the housings can be oriented selectably in one of a plurality of possible orientations (see, e.g., orientations of FIG. 1). As an example, magnetic components in housings may be correlated and coded, for example, with respect to north and south poles.

As an example, housings can include magnetic components at more than one edge. In such an example, two edges of two different housings can be magnetically attracted to each other for orienting the two different housings in, for example, a notebook orientation such as the orientation 101 of FIG. 1. As an example, where two different housings are oriented in an orientation such as a closed clamshell orientation, magnetic components of one pair of edges and magnetic components of a second pair of edges may attract to maintain the two different housings in that orientation. As another example, where two different housings are oriented in an orientation such as a tablet orientation, magnetic components of one pair of edges and magnetic components of a second pair of edges may attract to maintain the two different housings in that orientation. As an example, two or more housings can include magnetic components at at least one edge and one or more of the housings can optionally include magnetic components at at least two edges. In such an example, the housings may be oriented in a variety of manners, optionally with or without separation of housings by decoupling at edges and rearrangement by recoupling at edges.

Figure 2:
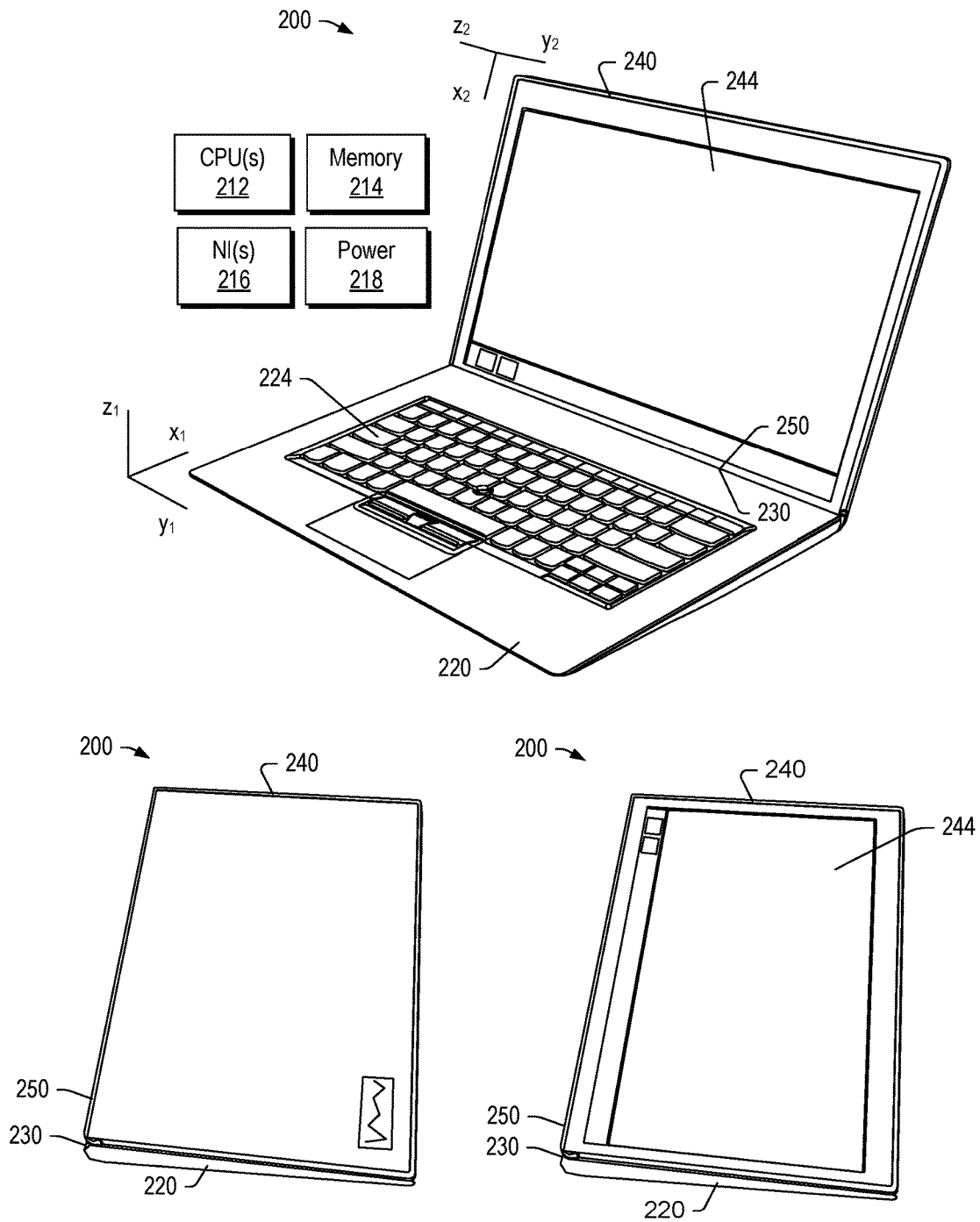
FIG. 2 is a diagram of an example of a device and examples of orientations of the device.

FIG. 2 shows an example of an apparatus 200 that includes a processor 212; memory 214 accessible by the processor 212; a first housing 220 that includes the processor 212 and a first magnetic edge 230 that includes a first engagement surface; and a second housing 240 that includes an electronic component 241 accessible by the processor 212 and a second magnetic edge 250 that includes a second engagement surface that engages the first engagement surface to pivotably couple the first housing 220 and second housing 240. As shown the apparatus 200 can include one or more network interfaces 216 and one or more power supplies 218 (e.g., one or more batteries).

Figure 3:
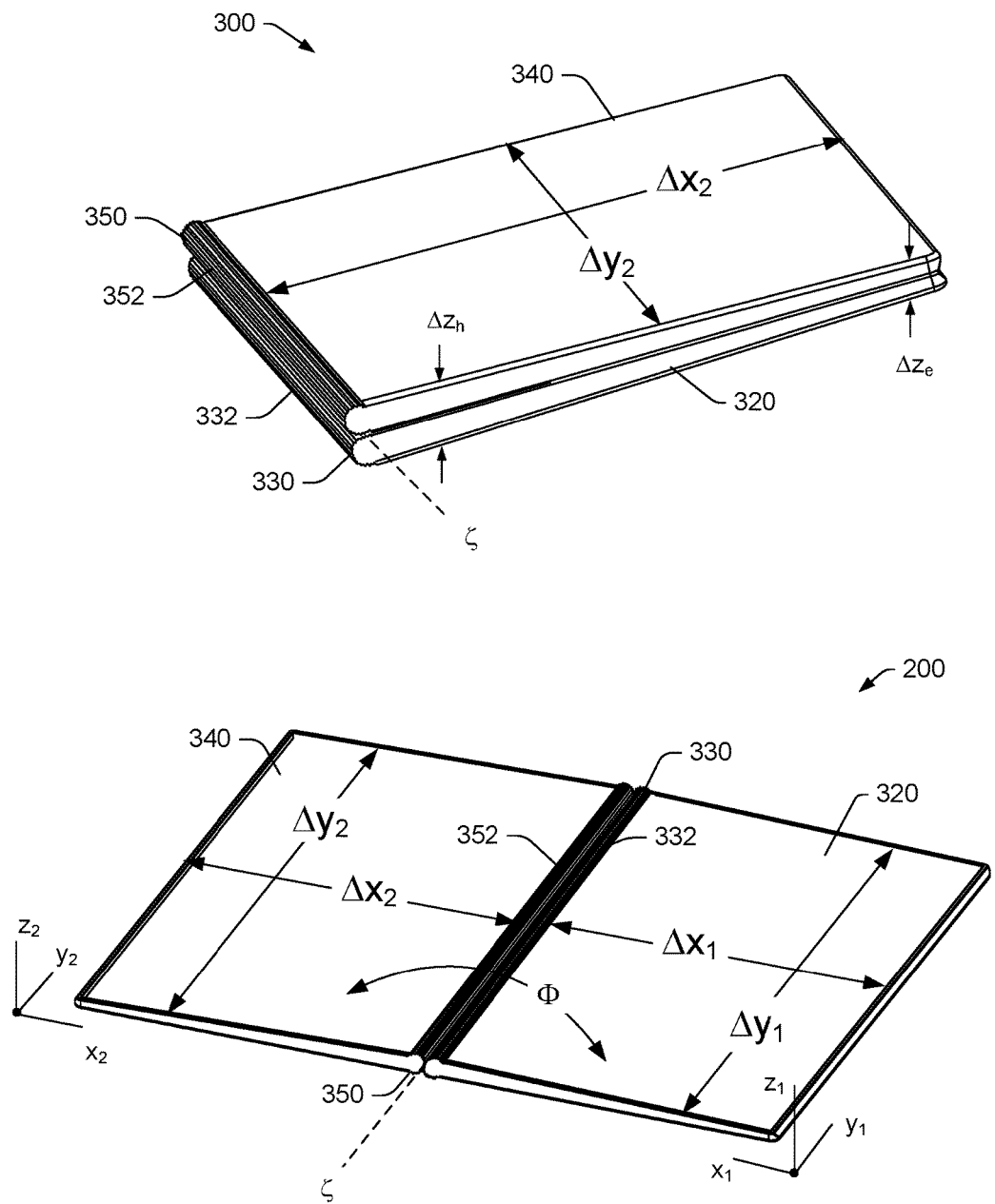
FIG. 3 is a series of diagrams of an example of a device in different orientations.

FIG. 3 shows an example of a device 300 that includes a first housing 320 that includes a first magnetic edge 330 that includes a first engagement surface 332; and a second housing 340 that includes a second magnetic edge 350 that includes an engagement surface 352 that engages the first engagement surface 332 to pivotably couple the first housing 320 and second housing 340. The device 300 can include, for example, the processor 212, the memory 214, the one or more network interfaces 216 and the one or more power supplies 218 (e.g., one or more batteries). As an example, the housings 320 and 340 may include a keyboard and a display or displays.

As an example, the magnetic edges 330 and 350 may be one or more of smooth, textured or toothed. The magnetic edges 330 and 350 can be magnetic by presence of one or more magnetic components, which may optionally be included as one or more magnetic component cores disposed in one or more receptacles of each of the housings 320 and 340.

Figure 4:
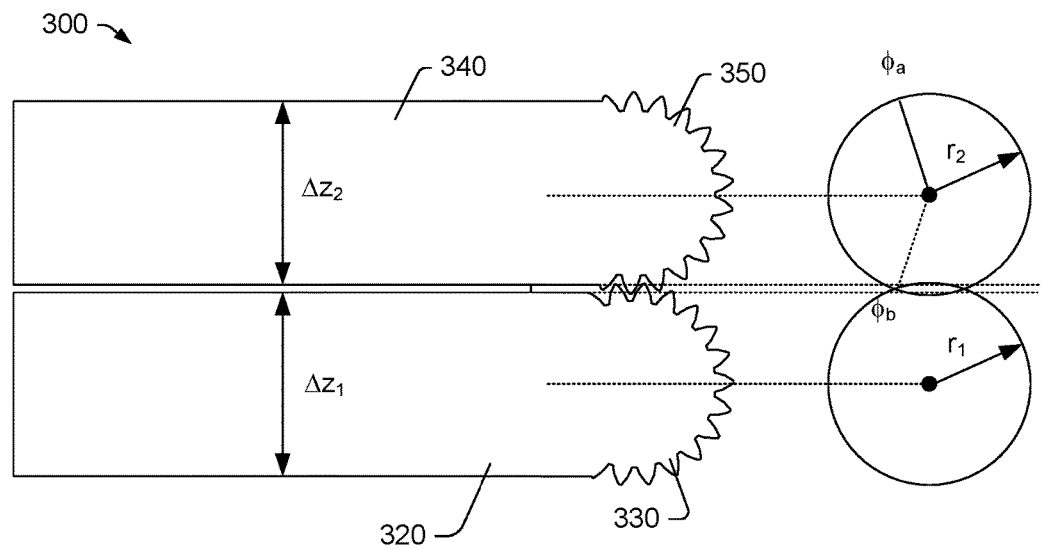
FIG. 4 is a series of diagrams of examples of housings and edges of housings.
Figure 4:
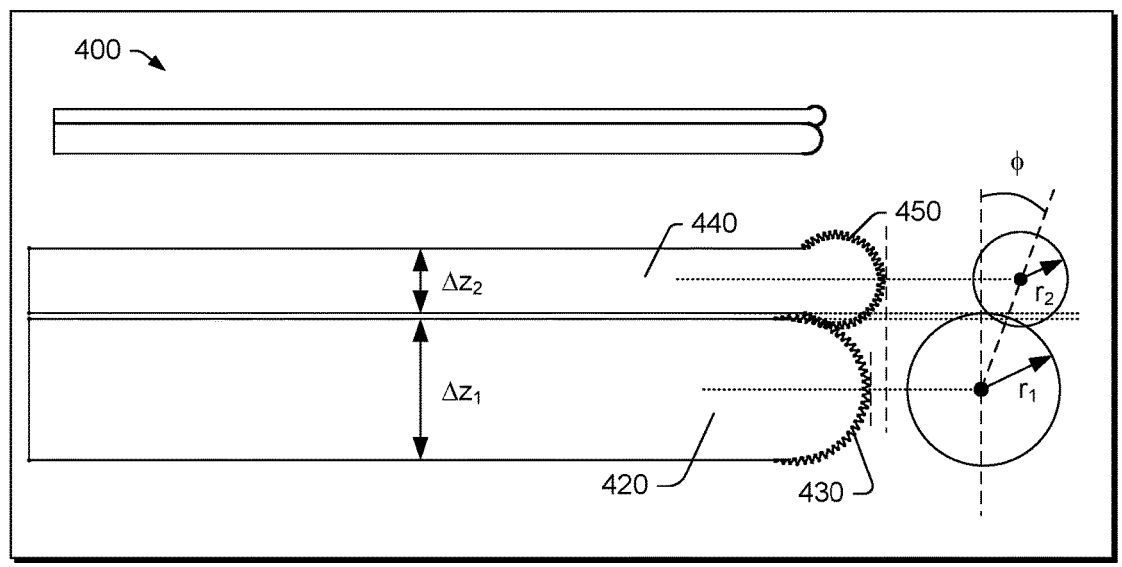

FIG. 4 shows a side view of the portion of the device 300 where teeth of the magnetic edges 330 and 350 of the housings 320 and 340 are shown as meshing. As shown, the housings 320 and 340 are of approximately the same thicknesses ($\Delta z_2$ and $\Delta z_1$) and outer radii are also approximately the same ($r_2$ and $r_1$). In the closed orientation shown, the axes (e.g., axle axes) are stacked vertically and the housings 320 and 340 are separated by a gap distance, noting that portions of the housings 320 and 340 can contact each other (e.g., consider extensions, pads, etc.). In such an example, where the housing 340 includes a display and where the housing 320 includes a keyboard, surfaces may be separated by the gap distance such that the keyboard does not contact the display; noting that contact may cause markings on the display.

FIG. 4 also shows a side view of a portion of a device 400 that includes housings 420 and 440 where magnetic edges 430 and 450 differ in size. As shown in FIG. 4, housing thicknesses ($\Delta z_2$ and $\Delta z_1$) may be selected and corresponding toothed gear radii ($r_2$ and $r_1$). As an example, a thinner housing may be a display housing whereas a thicker housing may be a base housing, which may include, for example, a keyboard. As shown in the closed orientation, the axes (e.g., axle axes) are not vertically stacked because the housing 440 is displaced from the housing 420 such that the length of the housing 440 can be greater than the length of the housing 420. As shown, the axes are offset in the closed orientation from vertical by an angle $\phi$, which may be about 20 degrees from vertical or about 70 degrees from horizontal. Thus, where housing thicknesses differ for two housings, in a closed orientation, axes, which may correspond to axles, can be offset by an angle. Further, as shown in FIG. 4, the edge 450 of the housing 440 is disposed below a planar, horizontal surface of the housing 420. As to operation to reorient the housings 440 and 420, the geared edge 450 can travel over an arc of about 140 degrees (e.g., given an offset angle of about 20 degrees from vertical or about 70 degrees from horizontal) when transitioning from a closed orientation (shown) to a back-to-back orientation. In contrast, for the assembly 300 as shown in FIG. 4, given that the axes are stacked (e.g., 0 degrees from vertical or 90 degrees from horizontal), a corresponding transition would be approximately 180 degrees. Thus, as illustrated in FIG. 4, various relationships can exist between housing thicknesses, radii of teeth of geared edges and transitions from one orientation to another orientation.

In the example of FIG. 4, the assembly 300 includes geared magnetic edges 330 and 350 with teeth that span an arc angle from angle $\phi_a$ to $\phi_b$ where $\phi_a$ and $\phi_b$ are about 20 degrees offset from vertical (towards the planar portion of the housing 302). Thus, about 14 teeth span an angle of about 220 degrees (e.g., 20+180+20). As to the assembly 400, about 40 teeth span an angle of about 280 degrees (e.g., 50+180+50) for the housing 440 and about 40 teeth span an angle of about 220 degrees (e.g., 20+180+20). As an example, a housing can include a geared magnetic edge that includes at least approximately 10 teeth. As an example, a housing can include a geared magnetic edge that includes at least approximately 20 teeth. As an example, a housing can include a geared magnetic edge that includes at least approximately 30 teeth.

In a geared edge approach, force applied to the gear teeth (e.g., via meshing between gear teeth of respective edges with magnetic attraction) can be relatively high; however, for aesthetics, the gear teeth size may be minimal (e.g., for hand carrying comfort). As an example, gear teeth may be made of one or more types of material, which may include metal (e.g., metal or alloy) and/or plastic (e.g., polymeric). As an example, a geared edge may be machined or otherwise formed as part of a housing.

As an example, where a device is of a relatively low mass and relatively small size (e.g., consider a display less than about 20 inches diagonally or about 50 cm diagonally), relatively long geared edges may be utilized to reduce force experienced by such geared edges. As an example, a geared edge may be about 4 inches long or more (e.g., about 10 cm long or more), as a width of a housing. As an example, a housing can be less than about 2 inches in thickness (e.g., less than about 5 cm in thickness). As an example, a housing can be less than about 1 inch in thickness (e.g., less than about 2.5 cm in thickness). As an example, a housing may be of a length, from back edge to front edge, that is about 4 inches or more (e.g., about 10 cm or more).

As an example, a geared edge may be formed of a molded plastic, which may result in lesser cost than machined metal (e.g., or machined alloy). Where a geared edge is integral to a housing, visible separations on the exterior of a computing device (e.g., clamshell device) may be minimized. As an example, a housing may be extruded where a geared edge is formed via an extruder die having a shape that imparts gear teeth or, for example, via a tool that imparts gear teeth in an edge after a housing without gear teeth exits an extruder die. For example, an extruder die can include a shape to form a housing with a radiused edge that is a portion of a circle in cross-section joined to a planar portion such that the radiused edge is of a larger thickness than the planar portion. In such an example, a tool may form teeth in the radiused edge by forming and/or removing material, which may be in a desired state upon exiting an extruder or other forming machine. For example, the material may be a thermoplastic material that is soft enough to be shaped by a tool that forms teeth in an edge (e.g., back edge) of a housing after the housing exits a forming machine that forms "raw" thermoplastic material into a stock shape.

As an example, a housing can be formed with one or more receptacles for receipt of one or more magnetic components. As an example, a housing may be formed around one or more magnetic components or, for example, formed with one or more receptacles into which one or more magnetic components are placed. As an example, a housing may be formed with one or more fixed position magnetic components, which may be, for example, inaccessible and encased in a housing material. As an example, a housing may be formed with one or more adjustable position magnetic components, which may be encased in housing material and not removable. For example, a housing may be formed with a substantially cylindrical magnetic component core that is not removable where the housing includes an access port (e.g., a bore) into which a tool may be inserted to adjust the substantially cylindrical magnetic component core (e.g., to rotate, to translate, etc.). In such an example, during manufacture and/or during use, one or more adjustments may be made to the core, for example, to assure proper alignment and/or desired alignment with respect to one or more magnetic components of another housing (e.g., for one or more orientations of the housings).

As an example, a gear can be larger in diameter than the face width of its teeth. With a small gear diameter, the width of the teeth might be twice or three times the diameter. Such a gear can be made and installed on a back edge of housing of a laptop computing device. When compared to an integral gear, an assembly step is involved to attach the gear to the housing of the laptop computing device.

As an example, a geared edge may include teeth over an angle of about 200 degrees of a circumference of a back edge of a housing such as a screen and/or a keyboard portion of a laptop computing device. In such an example, the teeth in the 200 degree span can be fixed in place, unable to rotate in relation to a respective half of the laptop computing device.

As an example, a method can include creating gear teeth as part of a housing (e.g., an external cover) of a clamshell computing device. As an example, such a housing may be made via injection molding using plastic (e.g., a polymeric material) where teeth are included as part of a mold. As mentioned, a method may include machining a housing or housings with teeth from metal or plastic.

As an example, a geared edge may have a width that is up to approximately 100 percent of the width of a clamshell computing device (see, e.g., dimensions $\Delta y_1$ and $\Delta y_2$ in FIG. 3). In such an example, with such a relatively long gear, force can be spread out, which may allow for use of materials that are softer than hardened metals or hardened alloys. As an example, where geared edges are utilized, fewer assembly steps may result.

As an example, where a housing is made of metal (e.g., metal or metal alloy), a geared edge may be machined during a machining process that machines the housing for one or more other purposes.

As an example, integral gears (e.g., housings with geared edges) can reduce part count of a computing device, which may reduce various costs and/or assembly times. As an example, an aesthetic benefit may result from a lack of a visible gap between gears and housings where they are integral and, made of the same material, optionally with a similar or same type of finish.

Figure 5:
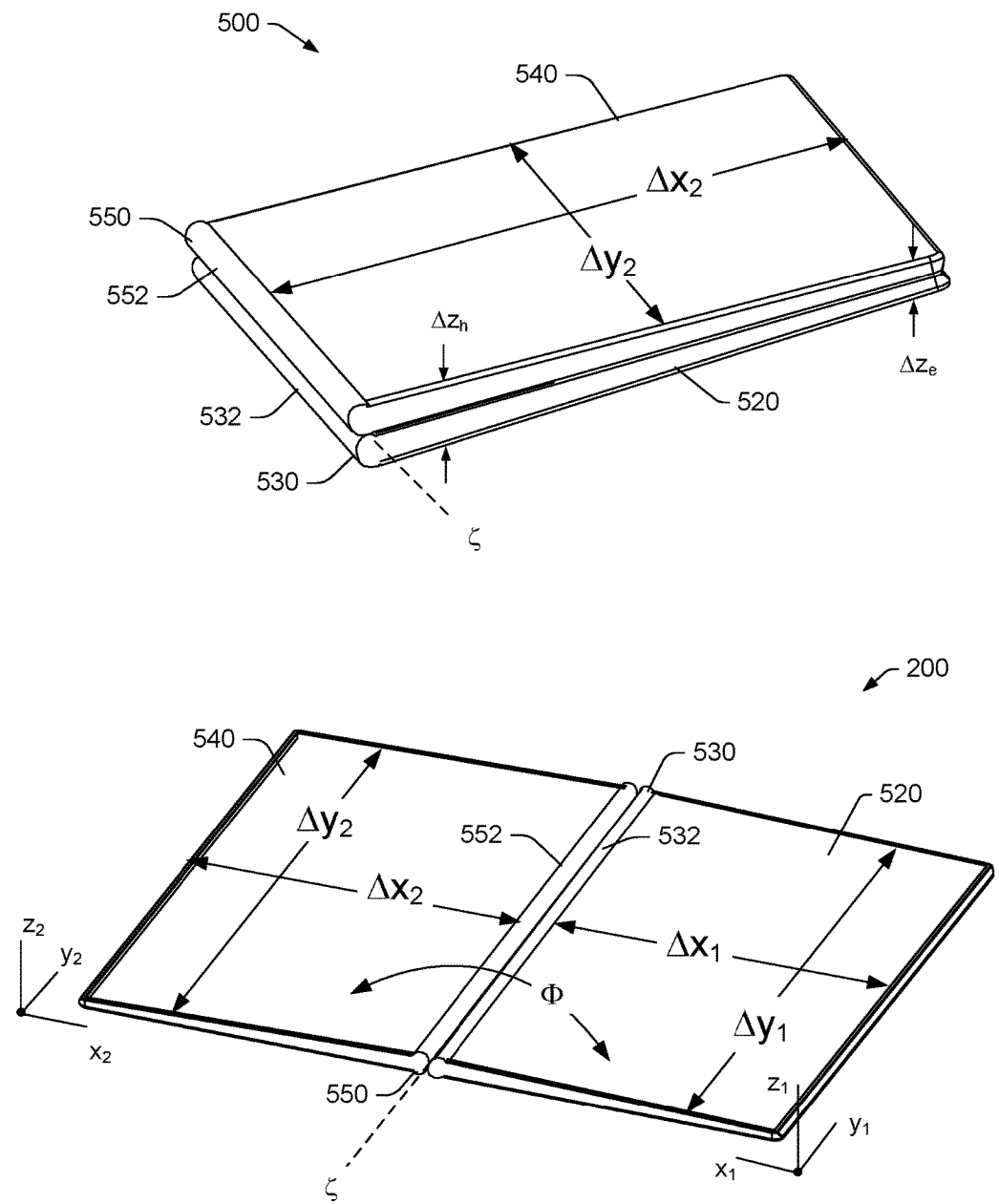
FIG. 5 is a series of diagrams of an example of a device in two different orientations.

FIG. 5 shows an example of a device 500 that includes a first housing 520 that includes a first magnetic edge 530 that includes a first engagement surface 532; and a second housing 540 that includes a second magnetic edge 550 that includes an engagement surface 552 that engages the first engagement surface 532 to pivotably couple the first housing 520 and second housing 540. The device 500 can include, for example, the processor 212, the memory 214, the one or more network interfaces 216 and the one or more power supplies 218 (e.g., one or more batteries). As an example, the housings 520 and 540 may include a keyboard and a display or displays.

In the example of FIG. 5, the edges 530 and 550 can be smooth edges or textured edges. As an example, the edges 530 and/or 550 may be formed integral to their respective housings 520 and 540.

Figure 6:
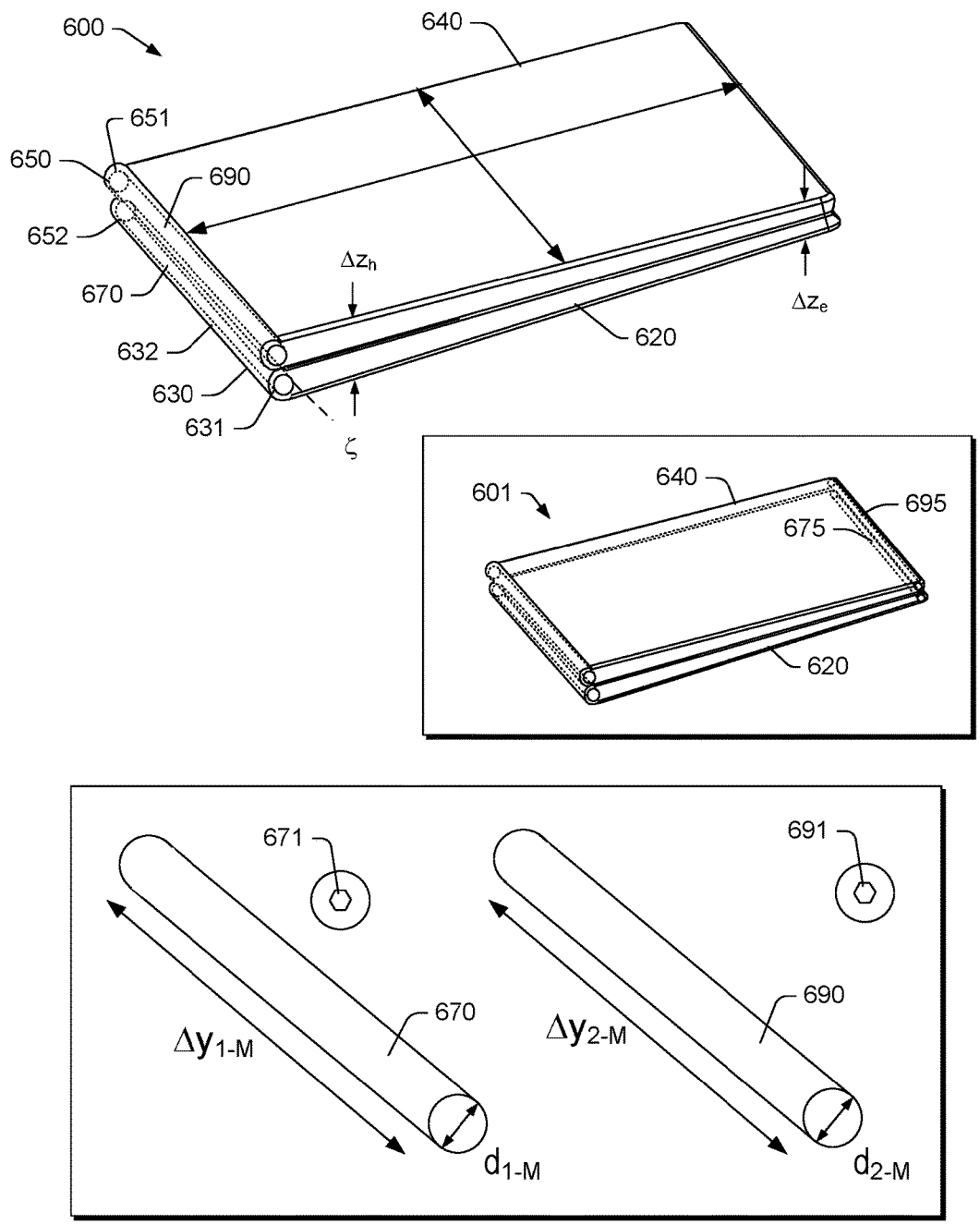
FIG. 6 is a series of diagrams of an example of a device that includes example magnetic component cores.

FIG. 6 shows an example of a device 600 that includes a first housing 620 that includes a first magnetic edge 630 that includes a first engagement surface 632; and a second housing 640 that includes a second magnetic edge 650 that includes an engagement surface 652 that engages the first engagement surface 632 to pivotably couple the first housing 620 and second housing 640. The device 600 can include, for example, the processor 212, the memory 214, the one or more network interfaces 216 and the one or more power supplies 218 (e.g., one or more batteries). As an example, the housings 620 and 640 may include a keyboard and a display or displays.

In the example of FIG. 6, the housings 620 and 640 can include receptacles for magnetic component cores 670 and 690. For example, the housings 620 and 640 may be made of a material or materials, optionally integrally formed, where the housings 620 and 640 include bores 631 and 651, respectively, as receptacles that can receive the magnetic component cores 670 and 690. The magnetic component cores 670 and 690 may be cylindrical and include magnetic material or magnetic materials. As an example, magnetic component cores such as the core 670 and/or the core 690 may be constructed (e.g., formed) with particular magnetic fields.

FIG. 6 also shows an example of a device 601 that includes the first housing 620 and the second housing 640 where the first housing 620 includes another magnetic component core 675 and where the second housing 640 includes another magnetic component core 695. In such an example, the housing 620 can include one or more receptacles at the front edge and the housing 640 can include one or more receptacles at the front edge. As an example, the magnetic component cores 675 and 695 may attract to help retain the device 601 in the closed, clamshell orientation shown in FIG. 6. As an example, the magnetic component cores 675 and 695 may attract to help retain the device 601 in a tablet orientation. As an example, the housings 620 and 640 may be separable, oriented and coupled via magnetic attraction provided by two or more magnetic component cores.

As an example, a housing may be fitted with a plurality of magnetic component cores. For example, consider a left side magnetic component core and a right side magnetic component core. As an example, more than two cores may be disposed in each of two housings. As an example, a core may be positioned to span a distance Δy that does not interfere with one or more electronic components of a device. As an example, a housing can include one or more receptacles that receive one or more magnetic components.

As an example, a magnetic component core may be interference fit into a receptacle of a housing of a device. In such an example, the magnetic component core may be oriented in a particular manner such that one or more magnetic components align with one or more magnetic components in a receptacle of another housing of the device. As an example, a magnetic component core may be adjustable. For example, consider a socket on an end of a magnetic component core that can be fit with a tool (e.g., a wrench, a screwdriver, etc.) such that the magnetic component core can be rotated within a receptacle of a housing. In such an example, a user may fine tune the orientation or orientations of one or more magnetic component cores to provide a desired angle or angles between two housings of a device. Referring again to FIG. 6, a socket 671 is shown as being optionally included in an end of the magnetic component core 670 and a socket 691 is shown as being optionally included in an end of the magnetic component core 690. As an example, a magnetic component core may include sockets at two opposing ends. As an example, a socket may be a hex, a TORX™ socket or other type of socket where a tool may be utilized to engage the socket and adjust orientation (e.g., rotation) of a magnetic component core.

In FIG. 6, various dimensions are shown with respect to the magnetic component cores 670 and 690, which include lengths $\Delta y_{1-M}$ and $\Delta y_{2-M}$ and diameters $d_{1-M}$ and $d_{2-M}$. The housings 620 and 640 can include corresponding receptacles to housing the magnetic component cores 670 and 690, which may be formed during a forming process of the housings 620 and 640. For example, one or more magnetic component cores may be placed in a mold into which material is introduced to form a housing. In such an example, upon cooling, the one or more magnetic component cores may be permanent within in that the one or more magnetic component cores are not removable from the housing. Such an approach may facilitate manufacture, particularly as magnets can attract debris, other components, etc. such that, otherwise, they may require special handling procedures. Further, as small magnets may pose risks for people and/or other animals, such an approach can increase safety.

As to the bores 631 and 651, these may be formed into a housing and/or machined into a housing. For example, a housing may be formed via a molding process where a rod is positioned in a mold into which a molten material can be introduced. Upon solidification, the rod may be removed to provide a bore. As an example, a housing may be formed as a monoblock piece of material that can be drilled or otherwise machined to form a receptacle (e.g., a bore, etc.). As mentioned, a housing may be formed with a relatively smooth surface and/or with a feature surface, which may provide for meshing and/or friction (e.g., where two housing are held in contact with each other view magnetic components).

Figure 7:
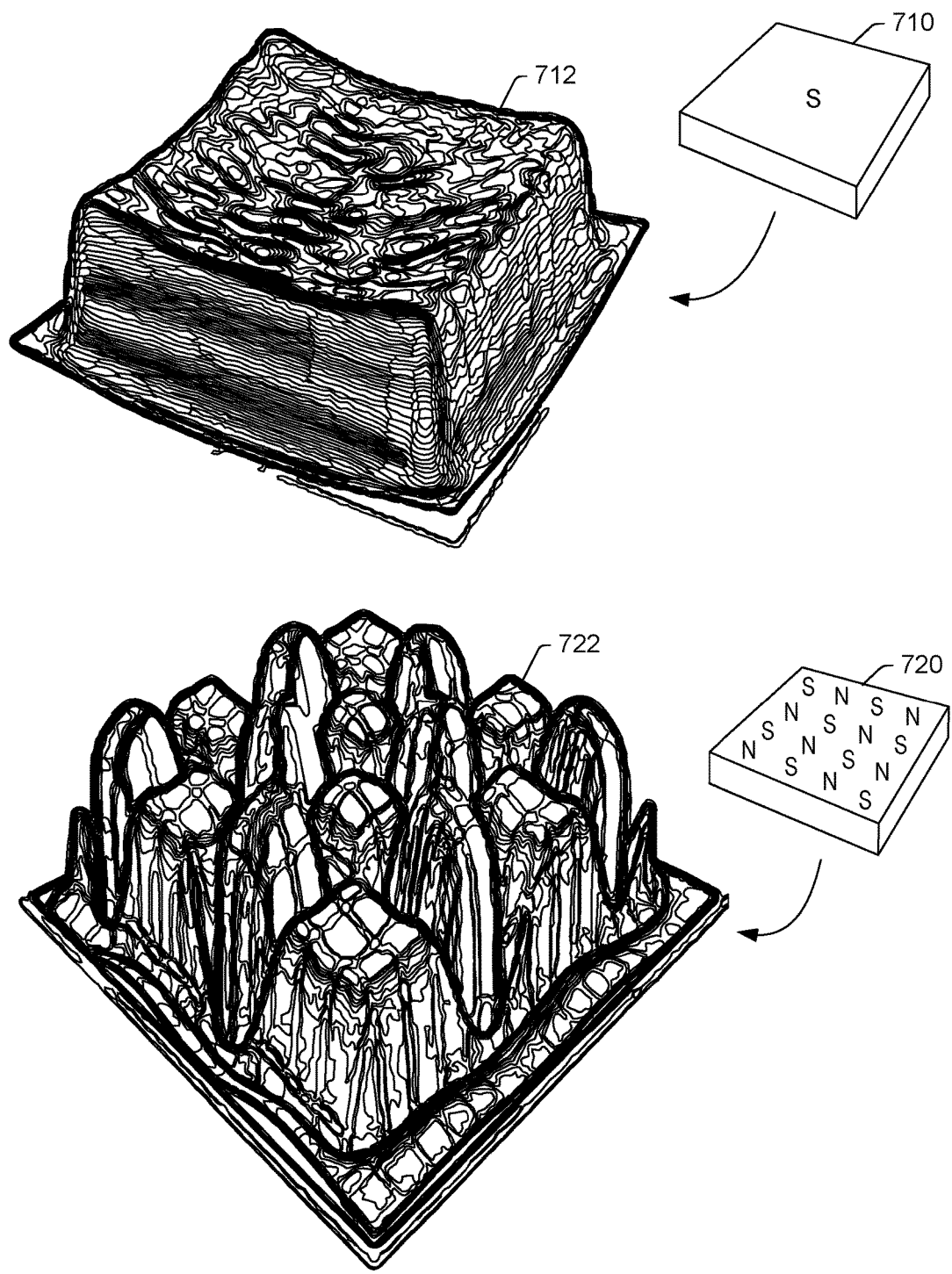
FIG. 7 is a diagram of a magnetic pole and a diagram of magnetic poles.

FIG. 7 shows an example of a magnet 710 with a single north pole and a single south pole and an example of a magnet 720 with a plurality of north poles and a plurality of south poles. FIG. 7 also shows approximate three-dimensional field plots 712 and 722 for the magnets 710 and 720, respectively. In the plot 722, the field varies in a manner that corresponds to the arrangement of the plurality of north poles and the plurality of south poles of the magnet 720.

As an example, a plurality of north poles and a plurality of south poles may define an array of poles. As an example, each element in an array of poles may be referred to as a field emission source where an array includes a plurality of field emission sources. A field emission source can be referred to as a magnetic component and an array may be referred to as a magnetic component. As an example, a magnetic component core can include a plurality of field emission sources, which may be arranged as one or more arrays.

As an example, an array of field emission sources can be one of a one-dimensional array, a two-dimensional array, or a three-dimensional array. The polarities of the field emission sources can be at least one of north-south polarities or positive-negative polarities. As an example, an array may be oriented according to a cylindrical coordinate system where, for example, field emission sources are disposed azimuthally about a longitudinal axis where the field emission sources may be adjacent and/or spaced over an arc span. In such an example, field emission sources may be adjacent to each other and/or spaced axially. For example, consider a series of field emissions sources as linear arrays where each linear array is disposed at a different angle about a longitudinal axis of a magnetic component core. In such an example, the different angles may define in part angles at which two housings can be aligned, which may include an approximately 0 degree angle, an approximately 70 degree to 120 degree angle, an approximately 180 degree angle and an approximately 360 degree angle; noting that one or more additional angles may be provided (e.g., consider a "tent" angle in a range from about 270 degrees to about 360 degrees).

As an example, at least one of the field emission sources can be a magnetic field emission source and/or an electric field emission source. For example, in an array, at least one of the field emission sources can be a permanent magnet, an electromagnet, an electro-permanent magnet, an electret, a magnetized ferromagnetic material, a portion of a magnetized ferromagnetic material, a soft magnetic material, or a superconductive magnetic material.

As an example, at least one of a first field emission structure and a second field emission structure can be at least one of a back keeper layer, a front saturable layer, an active intermediate element, a passive intermediate element, a lever, a latch, a swivel, a heat source, a heat sink, an inductive loop, a plating nichrome wire, an embedded wire, or a kill mechanism. As an example, at least one of a first field emission structure and a second field emission structure can be a planer structure, a conical structure, a cylindrical structure, a curved surface, or a stepped surface.

As an example, a method may be implemented for producing one or more magnetic field emission structures. As an example, a first magnetic field emission structure can include an array of individual magnets, for example, below a ferromagnetic material (e.g., consider iron) that is to become a second magnetic field emission structure. In such an example, the second magnetic field emission structure can include the same coding as the first magnetic field emission structure.

As an example, consider a method where ferromagnetic material is heated to at least its Curie temperature (for antiferromagnetic materials this would instead be the Neel temperature) and then brought in contact with a first magnetic field emission structure and allowed to cool. Thereafter, the ferromagnetic material takes on substantially the same magnetic field emission structure properties of the first magnetic field emission structure and becomes a magnetized ferromagnetic material, which is itself a magnetic field emission structure. As an example, where another ferromagnetic material is heated to at least its Curie temperature and then brought in contact with the magnetized ferromagnetic material, it too can take on substantially the same magnetic field emission structure properties of the magnetized ferromagnetic material.

As an example, a method of making a magnetic field emission structure from a ferromagnetic material can include using one or more lasers to selectively heat up field emission source locations on the ferromagnetic material to at least its Curie temperature and then subject the locations to a magnetic field (e.g., or fields). In such an approach, the magnetic field to which a heated field emission source location may be subjected may have a substantially constant polarity or, for example, have a polarity varied in time so as to code the respective source locations as they are heated and cooled.

As an example, a method can include adding one or more intermediate layers to a magnetic field emission structure. For example, consider a method where each intermediate layer is intended to smooth out (e.g., or suppress) spatial forces when any two magnetic field emission structures are brought together such that sidelobe effects are substantially shielded. As an example, an intermediate layer can be active (e.g., saturable such as iron) or inactive (e.g., air or plastic).

As an example, a magnetic field emission structure can include a heat sink material and/or an embedded kill mechanism, which may include, for example, an embedded wire (e.g., nichrome) coil that includes connector leads. In such an example, where heat is applied from outside the magnetic field emission structure, the heat sink material can help to avoid magnets of the magnetic field emission structure from reaching their Curie temperature. However, where it is desirable to kill at least a portion of the magnetic field emitted by the magnetic field emission structure, a current can be applied to connector leads to cause the wire coil to heat up to the Curie temperature. As an example, an electromagnetic field may be generated by a coil that may alter a magnetic field of a magnetic field emission structure. As an example, a method can include embedding a wire coil (e.g., a nichrome wire or wires) into one or more magnetic field structures and/or plating one or more wires onto one or more magnetic field structures.

Various different combinations of magnets, optionally having different strengths, can be oriented in various ways to achieve desired spatial forces as a function of orientation and separation distance, for example, between two magnetic field emission structures. For example, a similar aligned attract—repel equilibrium may be achieved by grouping a sparse array of larger magnets tightly together in a center of a magnetic field emission structure. As an example, combinations of correlated and non-correlated magnets may be used together, for example, where weaker magnets may be uncorrelated magnets. As an example, an equilibrium approach may enable relatively frictionless traction (e.g., or hold) forces to be maintained.

As an example, a method can include using one or more vacuum tweezers for placing magnets having first and second polarities into machined holes in a support frame, for example, in accordance with a desired code. As an example, magnets may be held in place in a support frame using an adhesive (e.g., a glue). As an example, holes and magnets may include threads whereby vacuum tweezers or another type of tool may be utilized to screw them into place. As an example, a support frame may be part of a housing or, for example, part of a core that can be fit into a receptacle of a housing (e.g., a bore of a housing, etc.).

As an example, to generate one or more magnetic fields a current can be applied to an inductive element that may include a coil or a discontinuity on a conductive sheet or conductive plate. As an example, a coil may be operatively coupled to a core that may be a material having a high permeability such as Mu-metal, permalloy, electrical steel, or METGLAS™ magnetic alloy (e.g., an amorphous metal alloy ribbon produced via a rapid solidification process marketed by Metglas, Inc., Conway, S.C.).

As an example, ferromagnetic material may be unmagnetized ferromagnetic material prior to being subjected to a field of a magnet. As an example, the ferromagnetic material may be magnetized ferromagnetic material, for example, consider a permanent magnet where orientation thereof would result in either attraction or repulsion (e.g., depending on respective field orientations, distance, etc.).

As an example, velocity of material can have an effect on behavior. For example, consider an object being accelerated into a bore of a coil where flux linkage may increase, generating an induced voltage in the coil that can opposes a supply voltage. Such a mechanism can act to reduce current in the coil and the magnetic field which, in turn, can induce a voltage that tries to maintain the current of the coil. Speed of an object can affect this mechanism, for example, a slower speed of the object may have a lesser effect on current in a coil compared to a faster speed of the object. While a coil is mentioned, such effects can be present for permanent magnets, for example, consider accelerating a plate of aluminum in a field gradient of a permanent magnet where eddy currents can be generated in the plate of aluminum that will act to oppose the field of the permanent magnet, thus, requiring greater force to move the plate of aluminum. Factors such as magnet field distribution, geometry/shape of an object, etc. can affect dynamic behavior.

As an example, in an unmagnetized ferromagnetic material, tiny current loops can be organized into small groups called domains. These domains may be orientated in random directions so that macroscopically, the material exhibits no magnetization. When an external field is applied, the loops within the domains can experience a torque force which tries to align them with the field. This means that domains which are originally more aligned with the field tend to grow at the expense of the less well aligned domains such that the better aligned domains "hijack" loops from the surrounding less well aligned ones. The stronger the external field becomes, the more fully aligned the loops become. Saturation of an object may be considered analogous to a loop reaching a maximum current.

As an example, an object may be modeled as a single "large" dipole (e.g., as a sum of many individual dipoles) that has its maximum pole strength determined by its saturation magnetization. As a field tends to be stronger towards its center, an induced front pole of an object experiences an attractive force which is stronger than the repulsive force generated by a rear pole of the object, resulting in a net attraction.

Ferromagnetic material can be "attracted" to the field of a magnet. In other words, the field of the magnet can act to align domains of the ferromagnetic material, which results in an attraction force.

As an example, a magnetic component can be a ferromagnetic material and/or a magnet.

Figure 8:
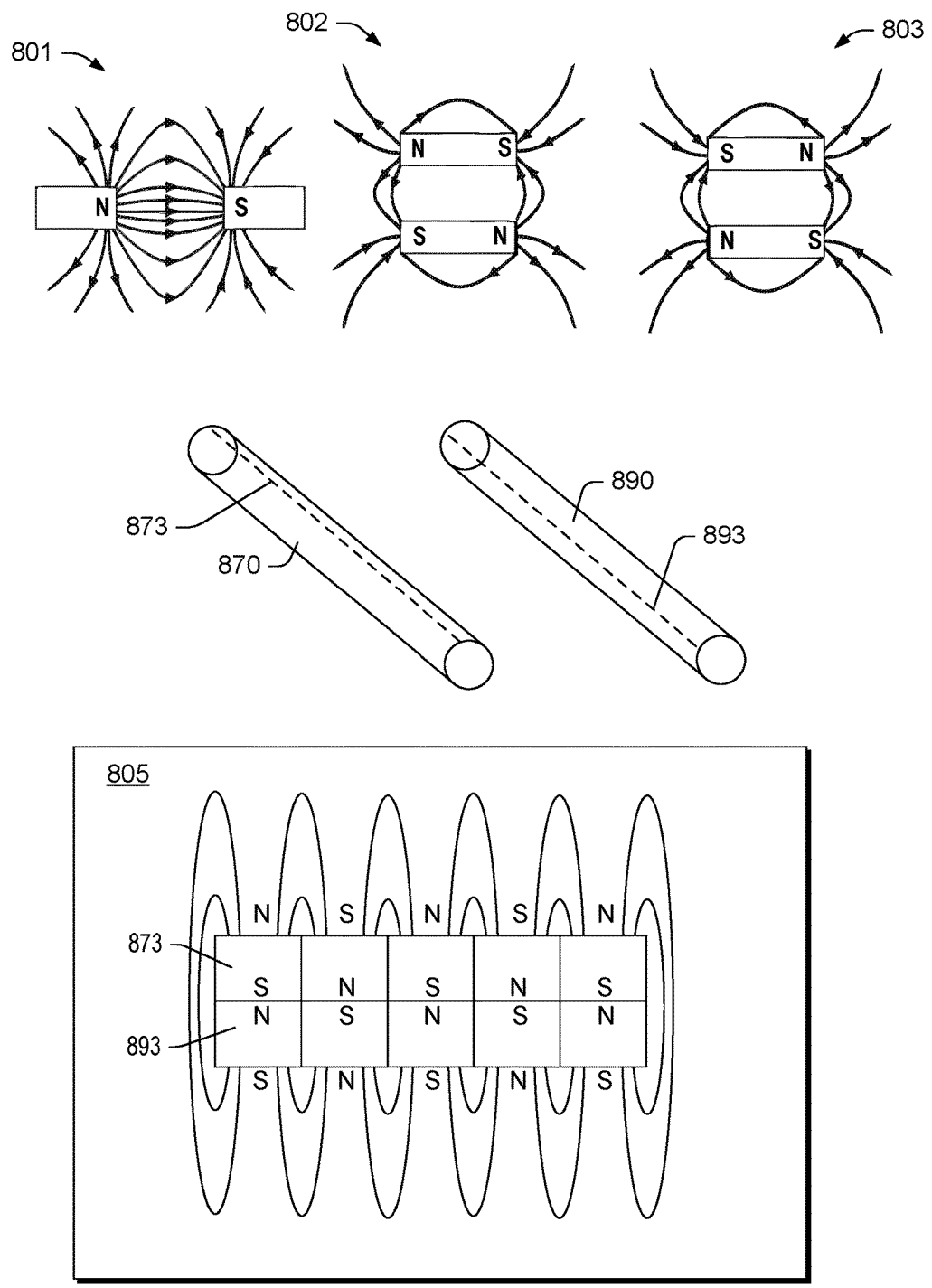
FIG. 8 is a series of diagrams of various examples of magnetic fields and examples of magnetic component cores.

FIG. 8 shows a few examples 801, 802 and 803 of how fields may interact with respect to magnetic poles for purposes of attraction; noting that like poles may provide for repulsion. FIG. 8 also shows example magnetic component cores 870 and 890, which may be suitable for use in housings such as a keyboard housing and a display housing if a device.

FIG. 8 further shows example states 805 of the magnetic component core 870 that includes five north poles and five south poles in a linear array 873 and the magnet component core 890 that includes five north poles and five south poles in a linear array 893.

As an example, the states 805 may be for a particular angle. For example, the cores 870 and 890 show dashed lines that may correspond to the linear arrays 873 and 893 as respective arrangements of magnetic components such that a housing that includes the core 870 may be disposed at an angle to a housing that includes the core 890 (e.g., where the two dashed lines are aligned, azimuthally and axially).

As an example, during assembly, the cores 870 and 890 may be aligned such that a closed clamshell orientation, a flat, planar orientation and a tablet orientation may be achieved. As an example, each of the cores 870 and 890 can include a plurality of magnetic components along their respective lengths and disposed at azimuthal angles in a cylindrical coordinate system (see, e.g., the linear arrays 873 and 893). For example, consider at least four angles such as approximately 0 degrees for a closed orientation, approximately 90 degrees to about 140 degrees for a laptop orientation, approximately 180 degrees for a flat, planar orientation, and approximately 360 degrees for a tablet orientation. As an example, a tent orientation may be included as well (e.g., about 270 degrees). As an example, pairings of north and south poles (e.g., in a series) may differ for angles or may be the same.

As an example, housings of a device may differ as to their arrangement of magnetic components. For example, a display housing may include fewer linear arrays of magnetic components that a keyboard housing, or vice versa. For example, a display housing may include an in-plane linear array that corresponds to a plane of a display of the housing and may include a linear array that is orthogonal to the plane, which may provide for a 0 degree orientation with respect to a keyboard housing (e.g., closed clamshell orientation). As an example, another linear array may be orthogonal to the display plane and provide for a 360 degree orientation with respect to the keyboard housing (e.g., a tablet orientation). As an example, a keyboard housing can include a plurality of linear arrays of magnetic components that determine angles at which a display housing may be positioned with respect to the keyboard housing (see, e.g., various orientations of FIG. 1).

As an example, a housing can include a coded series of magnetic poles that is to be matched with a coded series of magnetic poles of another housing. In such an example, the series may aim to maintain alignment of the housings (e.g., widthwise). As an example, where housings are detachable via a magnetic hinge, coding may aim to assure that reattachment occurs in a manner that aligns the housings using magnetics, optionally without one or more other types of alignment mechanisms. For example, alignment may be assured using coding of poles only. In such an example, the coding may assure that a display housing lines up with a keyboard housing in a manner where left and right edges align (e.g., without offset in a y-direction).

As an example, a coded set of magnetic components may allow for detaching a display housing from a keyboard housing and flipping the display housing and reattaching the display housing (e.g., consider transitioning from a laptop mode to a tablet mode by detaching the display housing from the keyboard housing, flipping the display housing and reattaching it to the keyboard housing with a display of the display housing facing away from keys of the keyboard housing). In such an example, the coded set of magnetic components may be symmetric. As another example, a coded set of magnetic components may be asymmetric such that a display housing and a keyboard housing can be coupled together in only one manner such as to achieve a closed clamshell orientation where a display of a display housing faces keys of a keyboard housing. In such an example, a tablet mode may be achieved by orienting the two housings with a 360 degree angle (see, e.g., FIG. 1).

As an example, a magnetic component core may be knurled at an end or otherwise include a feature that may be user adjustable such that a user may adjust an angle of orientation for two housings. For example, a magnetic component core may be rotatable about its axis in a receptacle (e.g., a bore) of a housing. Such an approach may allow a user to fine tune an angle, which may be, for example, a laptop orientation angle (see, e.g., the sockets 671 and 691 of FIG. 6).

As an example, a magnetic component core may be translatable in a receptacle for one or more purposes. For example, where an offset is desired in a y-direction between two housings, such an orientation may be achieved by translating a magnetic component core, which may include one or more arrays of magnetic components. As an example, a magnetic core may be replaceable, for example, with a same type of core or with a different type of core (e.g., different coding). As an example, coding may be azimuthal and/or longitudinal (e.g., along an axis).

Figure 9:
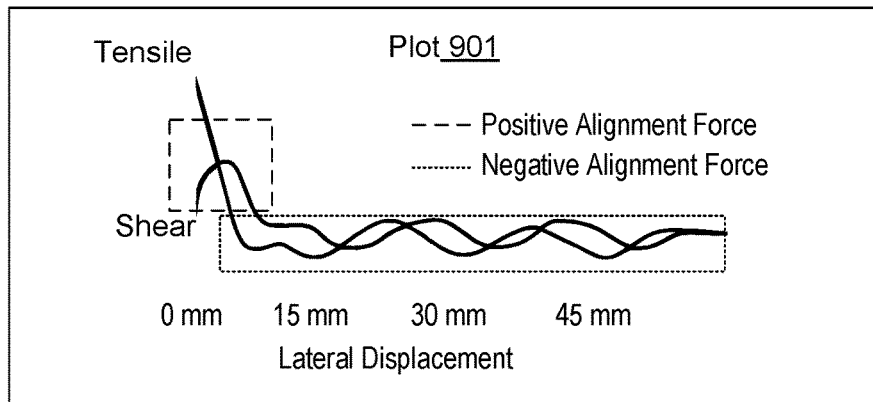
FIG. 9 is a series of diagrams of examples of magnetic components and examples of arrangements and forces.
Figure 9:
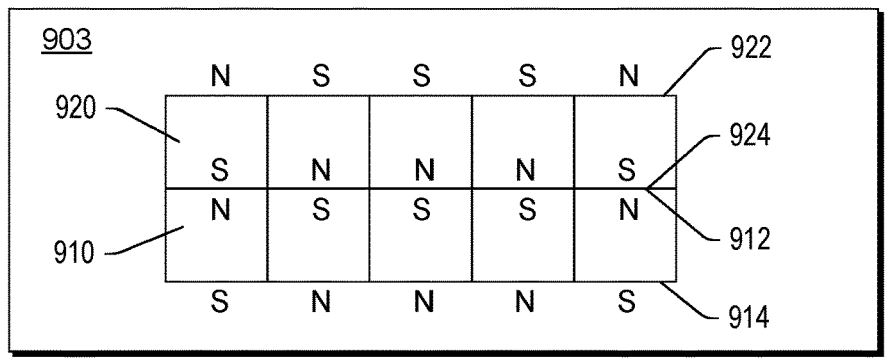
Figure 9:
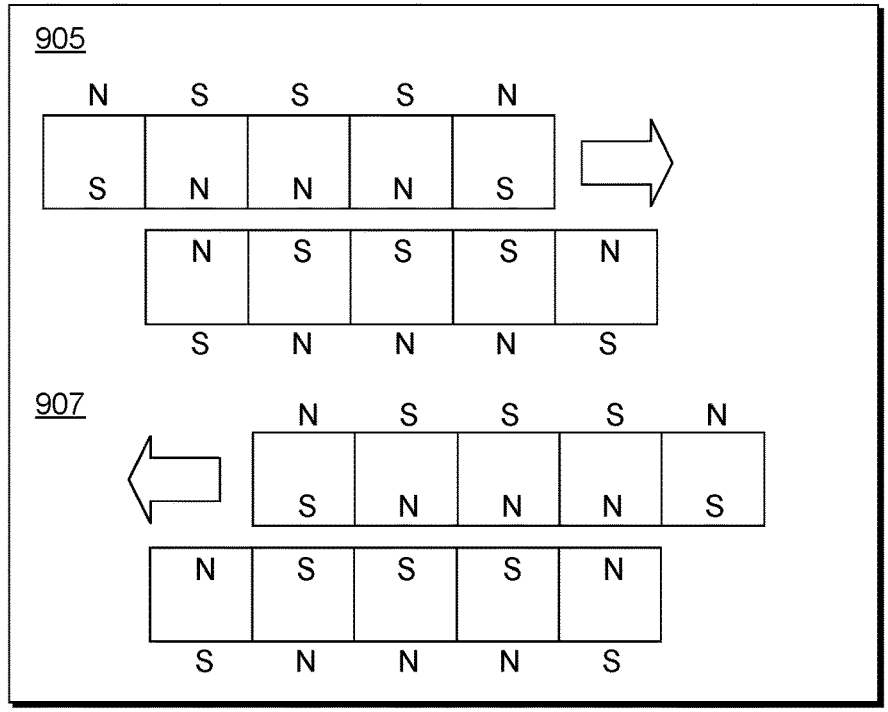

FIG. 9 shows an example of a plot 901 and example states 903, 905 and 907. In FIG. 9, the plot 901 shows magnet-to-magnet forces versus offset in a linear position at a fixed magnet-to-magnet distance of about 1.5 mm where the magnets may include poles arranged as in the magnet component cores 870 and 890 of FIG. 8. As an example, tensile force may be considered to be a holding force while shear force may be considered to be an alignment force. The plot 901 shows that the alignment force is greatest at a relatively low offset. As an example, an alignment force may exhibit maxima about a substantially zero offset. For example, when perfectly aligned, due to a region of relative homogeneity of fields, some small amount of displacement may occur without a substantial increase in alignment force; however, displacement beyond that small amount (e.g., in one or more directions) will cause an increase in the alignment force that may act to maintain alignment.

As an example, magnets can include an arrangement of poles (e.g., coding) that may differ from the arrangements of poles of the magnets of the magnetic component cores 870 and 890. As shown in FIG. 9, the magnet 910 includes five north poles and five south poles and the magnet 920 includes five north poles and five south poles where the arrangement of the poles differs from the arrangements of the poles (e.g., coding) in the magnets of the magnetic component cores 870 and 890 of FIG. 8. Specifically, the poles are arranged with common end poles and differing interior poles. The example states 903, 905 and 907 indicate how poles may be paired when aligned as in the state 903 and when displaced as in the states 905 and 907.

As an example, a magnetic component core may be utilized with a housing that includes a toothed edge, a smooth edge and/or a textured edge. As an example, a magnetic component core can include one or more magnets and/or one or more ferromagnetic components.

As an example, magnetic components may be provided as strips, as individual pieces, etc. and may be disposed in an edge of a housing such that the housing can be pivotably coupled to another housing and adjusted in its angle without using a mechanical hinge.

As an example, a magnetic material may be a surface of a housing such as an edge surface of a housing, which may optionally be formed and/or machined, optionally with teeth, etc. As an example, a device may include housings with key and keyway pairs that can be set to orient one housing of the device with respect to another housing of the device. As an example, a magnetic component may be coated with a material that allows for cleaning of debris from the surface. As an example, such a coating may be a low friction polymeric coating that allows user to wipe away debris. As an example, a magnetic component or magnetic components may be or include micro-programmable magnets. As an example, two housings may be spaced a distance without direct contact. As an example, such housings may be operatively coupled via wireless communication circuitry and, for example, each of the housings may include its own power supply (e.g., its own battery, etc.). As an example, two housings may include wireless battery charging circuitry where the two housings may be positioned on a single charger to charge both batteries at the same time.

As an example, a device can include one or more polymagnets. As an example, a device may include an arrangement of magnets that aims to provide attraction between housings without generating an excessive strong field that may extend well beyond edges where the housings are held together by magnetic attraction. As an example, coding of small magnetics arranged in series, in parallel, in one or more arrays, etc. may be utilized for magnetically coupling two housings of a computing device, optionally without using a mechanical hinges such as, for example, the hinge 132 of FIG. 1.

As an example, a device may be a two-housing device where each of the housings is configured differently as to electronic components. Or, for example, each of the housing may be configured substantially the same, optionally identically the same. As an example, a housing can include two edges that include magnetic components such that either of the two edges can be joined via magnetic force to another housing. As an example, where two housings of a device each include two edges with magnetic components, a number of orientations may be achieved, for example, depending on coding of magnetic components (e.g., if coding is implemented). As an example, two housings may be display housings that include touch-screen displays where one of the displays may optionally function at least in part as a keyboard. In such an example, both housings may form a dual display device where touch-input can be received via either of the housings.

As an example, a device can include a housing that is a tablet computing device and another housing that is a keyboard housing with a keyboard. In such an example, the keyboard housing may be magnetically attached to the tablet computing device where the keyboard may be utilized for touch-typing, etc. In such an example, a processor and memory of the tablet computing device may receive input via one or more interfaces operatively coupled to the keyboard of the keyboard housing, which may be or include one or more wireless interfaces.

As an example, an apparatus can include a processor; memory accessible by the processor; a first housing that includes the processor and a first magnetic edge that includes a first engagement surface; and a second housing that includes an electronic component accessible by the processor and a second magnetic edge that includes a second engagement surface that engages the first engagement surface to pivotably couple the first housing and second housing. In such an example, the first magnetic edge can include at least one magnet and, for example, the second magnetic edge can include a ferromagnetic material and/or at least one magnet.

As an example, a second magnetic edge can include at least one magnet and a first magnetic edge can include a ferromagnetic material.

As an example, a first magnetic edge and a second magnetic edge can apply a magnetic force that imparts a frictional force between the first engagement surface and the second engagement surface.

As an example, a first engagement surface can include a first geared surface, a second engagement surface can include a second geared surface and a first housing and a second housing can be pivotable via meshing of the first geared surface and the second geared surface. In such an example, the first magnetic edge can include a first cylindrical magnet with a first longitudinal axis, the second magnetic edge can include a second cylindrical magnet with a second longitudinal axis and the first and second longitudinal axes can be parallel. As an example, a first geared surface and a second geared surface can be formed of non-magnetic material. As an example, a first geared surface and a second geared surface can be formed of aluminum. As an example, a first geared surface and a second geared surface can be formed of plastic.

As an example, a first engagement surface and a second engagement surface can include concentric circular portions. For example, consider concentric circular portions that include an inner cylindrical portion and an outer cylindrical portion.

As an example, a first engagement surface can be integral to a first housing and/or a second engagement surface can be integral to a second housing.

As an example, a first housing and a second housing can form a clamshell. For example, a clamshell with a closed orientation and a planar orientation and, optionally, a back-to-back orientation.

As an example, a first housing can include a keyboard and a second housing can include a display.

As an example, a first housing can include a display and a second housing can include a keyboard.

As an example, a first housing and a second housing can be pivotably coupled without moving parts.

As an example, a first housing and a second housing can be detachable and reattachable via a first engagement surface and a second engagement surface. Such housings may be housings of a laptop computing device where the housings are operatively coupled via magnetic attraction force.

As an example, a first housing can be a display housing and/or a second housing can be a keyboard housing. Such housings can include one or more electronic components, which may be operatively coupled to at least one processor, which may be via wire, wires and/or wireless circuitry.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
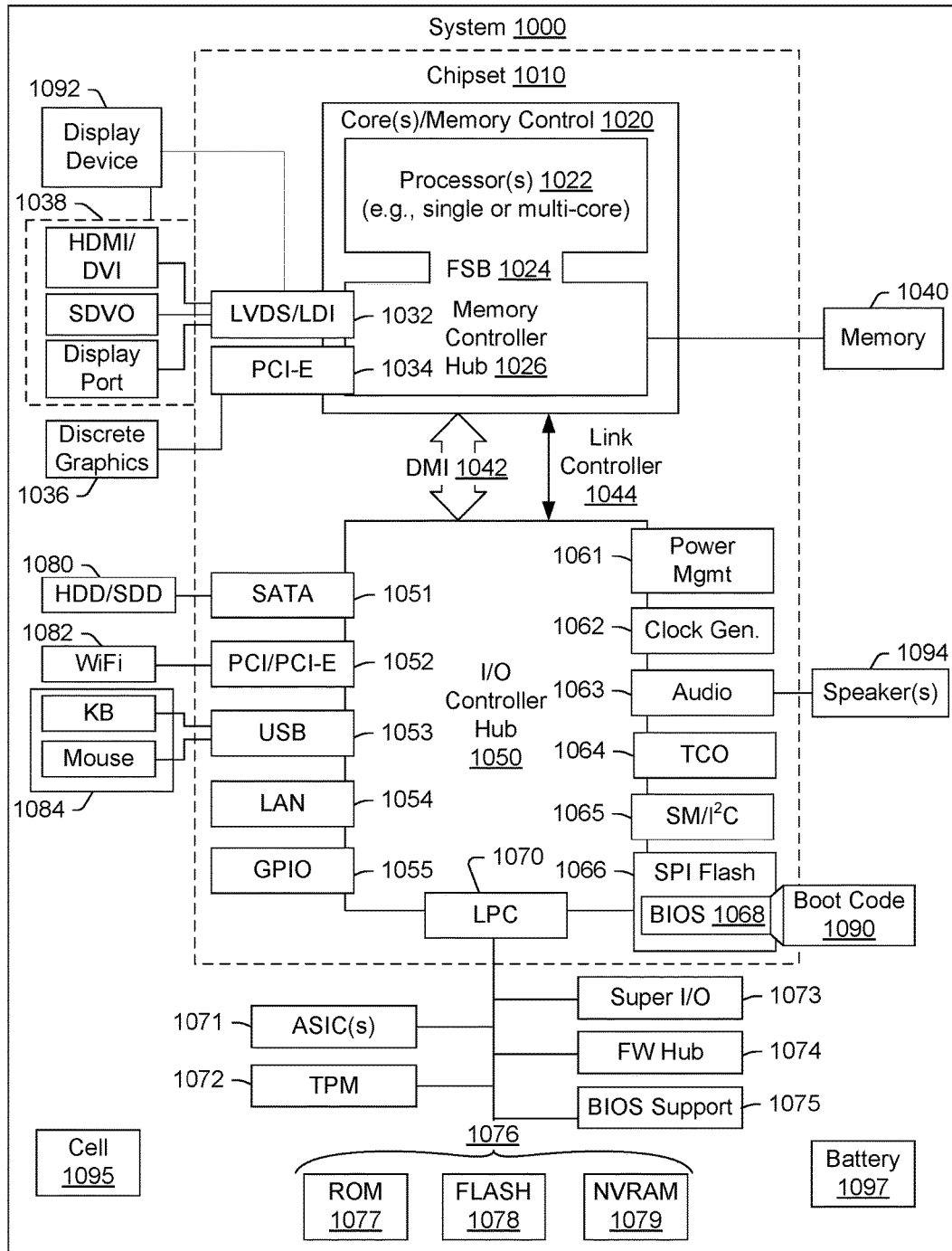
FIG. 10 is a diagram of an example of a system that includes one or more processors.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a housing, a satellite, a base, a server or other machine may include other features or only some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., $I^2C$, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
    a processor;
    a memory accessible by the processor;
    a first housing, defined by a width, that comprises the processor and a first magnetic edge that comprises a geared first engagement surface formed integral to and along the width of the first housing and along the first magnetic edge; and
    a second housing, defined by a width, that comprises an electronic component accessible by the processor and a second magnetic edge that comprises a geared second engagement surface formed integral to and along the width of the second housing and along the second magnetic edge that engages the geared first engagement surface to pivotably couple the first housing and the second housing.

2. The apparatus of claim 1 wherein the first magnetic edge comprises at least one magnet.

3. The apparatus of claim 2 wherein the second magnetic edge comprises a ferromagnetic material.

4. The apparatus of claim 2 wherein the second magnetic edge comprises at least one magnet.

5. The apparatus of claim 1 wherein the second magnetic edge comprises at least one magnet.

6. The apparatus of claim 5 wherein the first magnetic edge comprises a ferromagnetic material.

7. The apparatus of claim 1 wherein the first magnetic edge and the second magnetic edge apply a magnetic force that imparts a frictional force between the geared first engagement surface and the geared second engagement surface.

8. The apparatus of claim 1 wherein the first housing and second housing are pivotable via meshing of the geared first engagement surface and the geared second engagement surface.

9. The apparatus of claim 8 wherein the first magnetic edge comprises a first cylindrical magnet with a first longitudinal axis, wherein the second magnetic edge comprises a second cylindrical magnet with a second longitudinal axis and wherein the first and second longitudinal axes are parallel.

10. The apparatus of claim 1 wherein the geared first engagement surface and the geared second engagement surface are formed of non-magnetic material.

11. The apparatus of claim 1 wherein the first geared first engagement surface and the geared second engagement surface are formed of aluminum.

12. The apparatus of claim 1 wherein the geared first engagement surface and the geared second engagement surface are formed of plastic.

13. The apparatus of claim 1 wherein the first housing and the second housing form a clamshell.

14. The apparatus of claim 1 wherein the first housing comprises a keyboard and wherein the second housing comprises a display and/or wherein the first housing comprises a display and wherein the second housing comprises a keyboard.

15. The apparatus of claim 1 wherein the first housing and the second housing are pivotably coupled without moving parts.

16. The apparatus of claim 1 wherein the first housing and the second housing are detachable and reattachable via the geared first engagement surface and the geared second engagement surface.

\* \* \* \* \*